(12) United States Patent
Rilling et al.

(10) Patent No.: US 10,926,645 B2
(45) Date of Patent: Feb. 23, 2021

(54) TEMPERATURE CONTROL DEVICE, BATTERY SYSTEM, CONTROLLER AND METHOD FOR HEATING A BATTERY

(71) Applicant: Robert Bosch GmbH, Stuttgart (DE)

(72) Inventors: Christian Rilling, Stuttgart (DE); Gergely Galamb, Traunstein (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 15/659,921

(22) Filed: Jul. 26, 2017

(65) Prior Publication Data

US 2018/0029495 A1 Feb. 1, 2018

(30) Foreign Application Priority Data

Jul. 28, 2016 (DE) ...................... 10 2016 213 846.4

(51) Int. Cl.
*H01M 10/61* (2014.01)
*B60L 11/18* (2006.01)
(Continued)

(52) U.S. Cl.
CPC .......... *B60L 11/1874* (2013.01); *B60L 50/64* (2019.02); *B60L 58/26* (2019.02); *B60L 58/27* (2019.02);
(Continued)

(58) Field of Classification Search
CPC ...... B60L 11/1874; B60L 50/64; B60L 58/27; B60L 58/26; B60L 58/13; B60L 50/15; B60L 2240/12; B60L 2210/10; B60L 2250/26; B60L 2240/54; B60L 2240/441; B60L 58/10; B60L 2240/547; H01M 10/667; H01M 10/615; H01M 10/61; H01M 10/625; H01M 10/6568; H01M 2220/20; Y02T 10/70; B60Y 2200/92; B60Y 2400/303; B60R 16/02; B60W 2540/12;
(Continued)

(56) References Cited

U.S. PATENT DOCUMENTS 5,624,003 A 4/1997 Matsuku et al.
5,990,661 A 11/1999 Ashtiani et al.
(Continued)

FOREIGN PATENT DOCUMENTS

DE 102007017172 10/2008
DE 102010009847 9/2011
GB 2509308 7/2014

*Primary Examiner* — Drew A Dunn
*Assistant Examiner* — Sailesh Thapa
(74) *Attorney, Agent, or Firm* — Michael Best & Friedich LLP

(57) ABSTRACT

A temperature control device (1) for a battery system (100) having a circulation system (10) with a temperature control unit (20) for controlling the temperature of at least one battery (110) of the battery system (100), and at least one power semiconductor (30) for disconnecting and establishing a flow of electrical current between the at least one battery (110) and a consumer (200) of the at least one battery (110), wherein the at least one power semiconductor (30) is assigned to the temperature control unit (20) in such a way that the temperature control unit (20) can be heated by waste heat of the at least one power semiconductor (30) which is produced during the disconnection and/or establishment of the flow of electrical current.

20 Claims, 1 Drawing Sheet

(51) Int. Cl.

| | |
|---|---|
| *H01M 10/615* | (2014.01) |
| *H01M 10/667* | (2014.01) |
| *B60L 50/64* | (2019.01) |
| *B60L 58/27* | (2019.01) |
| *B60L 58/26* | (2019.01) |
| *H01M 10/625* | (2014.01) |
| *H01M 10/6568* | (2014.01) |

(52) U.S. Cl.
CPC ......... *H01M 10/61* (2015.04); *H01M 10/615* (2015.04); *H01M 10/625* (2015.04); *H01M 10/667* (2015.04); *H01M 10/6568* (2015.04); *H01M 2220/20* (2013.01)

(58) Field of Classification Search
CPC .. B60W 2540/10; B60W 20/00; B60W 10/26; B60W 30/18009
See application file for complete search history.

(56) References Cited

U.S. PATENT DOCUMENTS

| | | | |
|---|---|---|---|
| 2003/0157386 A1* | 8/2003 | Gottmann | H01M 8/04022 429/465 |
| 2006/0110639 A1* | 5/2006 | Walter | H01M 8/04104 429/423 |
| 2007/0029123 A1* | 2/2007 | Hochgraf | H01M 8/04089 429/429 |
| 2010/0330403 A1* | 12/2010 | Normann | H01M 10/3909 429/62 |
| 2012/0031128 A1* | 2/2012 | Li | B60H 1/00392 62/156 |
| 2013/0140001 A1* | 6/2013 | Mandl | B60H 1/004 165/96 |
| 2014/0302415 A1* | 10/2014 | Peterson | B60L 58/31 429/434 |
| 2016/0229282 A1* | 8/2016 | Hettrich | B60H 1/00278 |
| 2016/0359208 A1* | 12/2016 | Lear | H01M 10/625 |

* cited by examiner

TEMPERATURE CONTROL DEVICE, BATTERY SYSTEM, CONTROLLER AND METHOD FOR HEATING A BATTERY

BACKGROUND OF THE INVENTION

The present invention relates to a temperature control device for heating a battery or a battery module of a battery system, in particular a high-voltage battery system of an electric vehicle. In addition, the invention relates to a battery system with the temperature control device. Furthermore, the invention relates to a method for heating the battery of the battery system and to a controller which is configured and designed to carry out the method.

From the general prior art it is known that in order to cool a battery of a battery system for an electric vehicle the battery is arranged on a cooling plate of a cooling circuit. In addition to the cooling plate, a known cooling circuit also has a separate temperature control element and a coolant pump. The battery or battery cells of the battery can be heated at low temperatures by the separate temperature control element to such an extent that the cells can be charged and discharged with the highest possible currents. DE 10 2010 009 847 A1 and DE 10 2007 017 172 A1 also disclose reversing a direction of flow of the coolant in order to control the temperature of the battery.

SUMMARY OF THE INVENTION

The invention provides a temperature control device for heating a battery or a battery module of a battery system by means of which the battery can advantageously be heated in an efficient and cost-effective fashion. The invention also provides a battery system with the temperature control device according to the invention, a method for heating the battery by means of the temperature control device according to the invention, and a controller configured and designed to carry out the method according to the invention.

Further features of the invention can be found in the description and the drawings. The features and details which are described in relation to the temperature control device according to the invention also, of course, apply here in relation to the battery system according to the invention, the method according to the invention, the controller according to the invention and in each case vice versa, with the result that reference is always, or can always be made in a reciprocal fashion with respect to the disclosure of the individual aspects of the invention.

According to a first aspect of the present invention, a temperature control device for a battery system is made available. The temperature control device has a circulation system with a temperature control unit for controlling the temperature of at least one battery of the battery system. In addition, the temperature control device has at least one power semiconductor for disconnecting and establishing a flow of electrical current between the at least one battery and at least one consumer of the at least one battery. The at least one power semiconductor is assigned to the temperature control unit in such a way that the temperature control unit can be heated by waste heat of the at least one power semiconductor, which waste heat is produced during the disconnection and/or establishment of the flow of electrical current.

Within the scope of the present invention it has been advantageously found that the waste heat of a power semiconductor which is arranged in a battery system can be used to heat the temperature control unit and as a result correspondingly to heat a battery of the battery system which is or can be arranged on the temperature control unit. This is implemented here, in particular, by virtue of the fact that the at least one power semiconductor is assigned to the temperature control unit in such a way that the temperature control unit can be heated by waste heat of the at least one power semiconductor, which waste heat is produced during the disconnection and/or establishment of the flow of electrical current. As a result, it is possible to dispense with an additional heating element, customary in the prior art, for a cold start of a battery system in a motor vehicle. Therefore, corresponding costs for the additional heating element can be saved. Furthermore, by dispensing with additional components it is possible to reduce the complexity of a corresponding system. Furthermore, by means of the temperature control device in a battery system it is possible to reduce the weight, which is always a goal in particular in motor vehicles in which the present temperature control device can preferably be applied.

The at least one power semiconductor is assigned to the temperature control unit here in such a way that the temperature control unit can be heated by waste heat of the at least one power semiconductor, which waste heat is produced during the disconnection and/or establishment of the flow of electrical current. That is to say the at least one power semiconductor can be operatively connected to the temperature control unit in such a way that the temperature control unit can be heated by waste heat of the power semiconductor. In order to establish the desired operative connection or the desired transportation of heat from the at least one power semiconductor to the battery via the temperature control unit, the temperature control device preferably has a feed unit or a heat feed unit for establishing and disconnecting the transportation of heat from the at least one power semiconductor to the at least one battery via the temperature control unit. This makes it possible to ensure that the temperature control unit or the battery is heated by the waste heat of the at least one power semiconductor only in defined cases, for example in the event of a cold start of the motor vehicle.

For example, transistors with suitable switching properties and power properties can be used as the power semiconductors. By using a power semiconductor it is possible to achieve particularly rapid and short switching times. A power semiconductor is to be understood as being a semiconductor element which is configured, when used in a power electronic system, to control and switch high electrical currents and voltages, for example of more than 1 A to several kA and voltages of more than 24 V.

The present temperature control device is preferably designed for use in a vehicle or a motor vehicle, in particular in an electric vehicle. However, the invention is not restricted to use in a road vehicle. It is therefore possible for the temperature control device also to be designed for use in a rail vehicle, in a watercraft, in an aircraft and/or in a robot. Furthermore, the temperature control device can also be designed for use in a stationary system.

Within the scope of the present invention it is also possible for a plurality of power semiconductors to be arranged connected in parallel with one another. As a result, the waste heat can be distributed over a relatively large area. Furthermore, as a result excessive heating of an individual power semiconductor can be counteracted.

The at least one power semiconductor is preferably assigned to the temperature control unit in such a way that the waste heat of the at least one power semiconductor can be transported selectively in the direction of the at least one battery via the temperature control unit and, in particular, by means of the feed unit.

According to one development of the present invention, it is advantageously possible that the circulation system has a feed unit for feeding a temperature control medium through the circulation system, wherein the temperature control medium can be heated in the circulation system by the waste heat of the power semiconductor, heated temperature control medium can be fed to the at least one battery through the circulation system by means of the feed unit, and as a result the at least one battery can be heated. That is to say the at least one power semiconductor is assigned to the temperature control unit via a feed unit which is designed and arranged to transport heat between the temperature control unit and the at least one power semiconductor, wherein the temperature control unit can be heated by the waste heat of the at least one power semiconductor, which waste heat is produced during the disconnection and/or establishment of the flow of electrical current, by using the feed unit. The feed unit is preferably embodied here as a coolant pump for pumping the temperature control medium or a coolant. This permits a cost-saving and weight-saving double function of the feed unit or of the coolant pump. On the one hand, the feed unit feeds the temperature control medium for controlling the temperature of the at least one battery, in particular for cooling it, through the circulation system. On the other hand, the feed unit can reverse a direction of flow of the temperature control medium in the circulation system in such a way that as a result the waste heat of the at least one power switch can be transported directly or over the shortest path in the direction of the at least one battery, and the at least one battery can as a result be correspondingly heated. The at least one power semiconductor is for this purpose arranged in the vicinity of the temperature control unit in such a way that transportation of heat from the at least one power semiconductor into the temperature control unit or a thermal interaction between the power semiconductor and the temperature control unit is possible. Therefore, the transportation of heat can be selectively established from the at least one power semiconductor into the at least one battery by the temperature control unit by setting a corresponding direction of flow of the temperature control medium.

Furthermore, in a temperature control device according to the invention it is possible for the at least one power semiconductor to be arranged on the temperature control unit, in particular arranged directly on the temperature control unit. As a result, a preferred transportation of heat from the at least one power semiconductor into the temperature control unit is possible. Furthermore, the at least one power semiconductor can also be cooled by the temperature control unit when necessary. The at least one power semiconductor, or a functional component of the temperature control device with the power semiconductor, is in this context connected, in particular in a direct mechanical fashion, that is to say in a positively and/or frictionally locking fashion to the temperature control unit or to a functional component of the temperature control device with the temperature control unit. The direct connection between the at least one power semiconductor and the temperature control unit is to be understood as being a connection in which no, or essentially no, intermediate elements or no functional components are arranged between the at least one power semiconductor and the temperature control unit.

It is advantageous if in the case of a temperature control device according to the invention the at least one power semiconductor has at least one bipolar transistor with an insulated gate electrode (IGBT) and/or a power metal oxide semiconductor field-effect transistor (MOSFET) or is designed correspondingly. The IGBT has particularly high voltage limits and current limits. That is to say voltage of, for example, 7 kV and currents of, for example, 4 kA, with a power level of, for example, 100 MW, can be controlled and switched without damage by the IGBT. As a result, the IGBT can generate with a relatively safe and robust method of functioning during its operation a sufficiently high temperature control or a sufficiently high level of waste heat for heating the at least one battery. Furthermore, powerless or essentially powerless actuation is possible by virtue of the IGBT. Furthermore, the IGBT has particularly high impulse loadability. The power MOSFET has, like the IGBT, particularly high voltage limits and current limits. The power MOSFET also has a high level of robustness with respect to environmental influences. As a result, the power MOSFET is well suited for use in a motor vehicle.

According to a further aspect of the present invention, a battery system is made available, in particular for the electric drive of a motor vehicle. The battery system has at least one battery and a temperature control device which is described in detail above, wherein the at least one battery can be heated by the temperature control device. The battery system according to the invention therefore provides the same advantages as have been described in detail with respect to the temperature control device according to the invention.

The at least one battery preferably has a direct or essentially direct connection or thermal operative connection to the temperature control unit for the most direct possible transfer of heat. Likewise, the at least one power semiconductor preferably has a direct or essentially direct connection or thermal operative connection to the temperature control unit for the most direct possible transfer of heat.

The at least one battery is preferably electrically connected to at least one consumer of the at least one battery or can be electrically connected and disconnected to and from the consumer by means of an electrical or electromechanical connecting unit of the battery system. The at least one battery preferably has a plurality of battery cells which can be connected in series and/or in parallel. In this context, the battery system preferably also has a plurality of battery cells. The term consumer here is to be understood as meaning a system which is or can be supplied with current and voltage by the at least one battery. The consumer here is, for example, a motor vehicle network or an electric motor which is connected to the motor vehicle network.

The present battery system is preferably designed for use in a vehicle or a motor vehicle. However, the invention is not restricted to use in a road vehicle. It is therefore possible that the battery system is also designed for use in a rail vehicle, in a watercraft, in an aircraft, a machine and/or in a robot. Furthermore, the battery system can also be designed for use in a stationary system.

According to a further aspect of the present invention, a method for heating at least one battery of a battery system with a temperature control device is made available, wherein the temperature control device has a circulation system with a temperature control unit and at least one power semiconductor for disconnecting and establishing a flow of electrical current between the at least one battery and a consumer. In the method, the temperature control unit is heated by waste heat of the at least one power semiconductor, which waste heat is generated during the disconnection and/or establishment of the flow of electrical current. Therefore, the method according to the invention provides the same advantages as have been described in detail with respect to the device according to the invention. In particular, by virtue of the present method the waste heat of the at least one power semiconductor can, as has already been described above in detail, be advantageously used to heat the temperature control unit, by which, in turn, the at least one battery can be or is heated.

In one development of the present invention it is also possible that in the case of a method the circulation system has a feed unit for feeding a temperature control medium through the circulation system, wherein the temperature control medium is heated in the circulation system by the waste heat of the power semiconductor, heated temperature control medium is fed to the at least one battery or in the direction of the at least one battery through the circulation system by means of the feed unit, and as a result the at least one battery is heated. For the heating of the at least one battery it is possible for a direction of flow or the actual direction of flow of the temperature control medium to be reversed, as has already been described above. That is to say the direction of flow of the temperature control medium is directed in an opposite direction of flow by means of the feed unit compared to a case in which the at least one battery is not to be heated.

It is advantageous here if in a method according to the invention the at least one power semiconductor for heating the at least one battery is operated with an efficiency level which is lower than an efficiency level with which the at least one power semiconductor is operated when the at least one battery is not to be heated, or is not heated, by the at least one power semiconductor. By reducing the efficiency level it is possible to generate a relatively large heat loss or a relatively large amount of waste heat of the at least one power semiconductor. As a result, in the event of a cold start of the motor vehicle the at least one battery can be heated more quickly. If the at least one power semiconductor is operated with a low efficiency level or the lower efficiency level, the at least one power semiconductor generates a heat loss of more than 100 W, preferably in a range between 400 W and 1000 W, particularly preferably in a range between 500 W and 800 W. If the at least one power semiconductor is operated with a relatively high efficiency level of a normal efficiency level, the at least one power semiconductor generates a heat loss of approximately 200 W.

In order to generate the largest possible amount of waste heat in a short time it is also possible within the scope of the present invention for the flow of electrical current between the at least one battery and the consumer to be disconnected and restored by the at least one power semiconductor with a frequency in a range from 19 kHz to 25 kHz, in particular in a range from 19.5 kHz to 22 kHz. As a result, a sufficiently large amount of waste heat can be generated and the disconnection and restoring of the flow of current also occur outside a frequency range which can be perceived by human beings and consequently do not have a disruptive effect on persons in the surroundings of the battery system, for example a driver of a motor vehicle with the battery system.

According to a further aspect of the present invention, a controller for controlling the temperature of at least one battery of a battery system as described above is made available, wherein the controller is configured and designed to carry out the method which is also described above. For this purpose, the controller is connected at least in the data-transmitting fashion to the battery system and/or to the temperature control device by cable and/or radio. Thus, the controller according to the invention also provides the same advantages as have been described in detail with respect to the temperature control device according to the invention and the method according to the invention.

Further measures which improve the invention can be found in the following description of a number of exemplary embodiments of the invention which are illustrated schematically in the figures. All of the features and/or advantages which arise from the claims, the description or the drawing, together with structural details and spatial arrangements, can be essential to the invention both per se and in the various combinations.

BRIEF DESCRIPTION OF THE DRAWINGS

In the drawings, in each case in a schematic form.

Elements with an identical function and method of operation are respectively provided with the same reference symbols in FIGS. 1 and 2.

DETAILED DESCRIPTION

Figure 1:
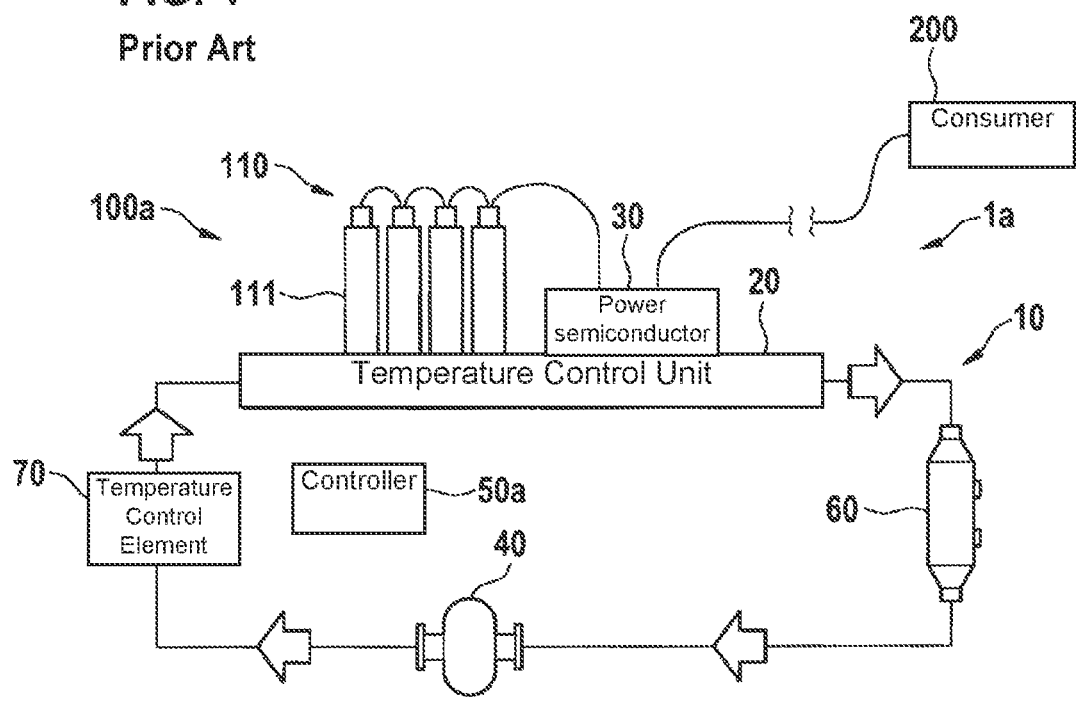
FIG. 1 shows a battery system with a temperature control device in the standard operating mode and FIG. 2 shows a battery system with a temperature control device according to an embodiment of the present invention for heating battery cells in a low temperature operating mode.

FIG. 1 is a schematic view of a battery system 100a for the electric drive of a motor vehicle. The battery system 100a has a temperature control circuit 10 in which an essentially plate-shaped temperature control unit 20 in the form of a cooling plate is arranged, wherein a power semiconductor 30 is arranged on the temperature control unit 20. Furthermore, a battery 110 with a plurality of battery cells 111 is arranged on the temperature control unit 20. In order to circulate a temperature control medium or coolant in the temperature control circuit 10 which is embodied as a cooling circuit a feed unit 40 in the form of a coolant pump 40 is arranged in the temperature control circuit 10. Furthermore, a heat exchanger 60 and a temperature control element 70 are positioned in the temperature control circuit 10. The temperature control element 70 is here a unit of a temperature control device 1a of the battery system 100a. FIG. 1 also illustrates a consumer 200 of the battery 110 which can be part of the battery system 100a. The consumer 200 and the battery 110 are or can be electrically connected to one another and correspondingly disconnected from one another by means of the power semiconductor 30. In order to perform open-loop and/or closed-loop control of the battery system 100a or of the temperature control device 1a, the battery system 100a has a controller 50a.

A battery system 100 according to the invention and a temperature control device 1 according to the invention for the battery system 100 will subsequently be described with respect to FIG. 2. The battery system 100 according to FIG. 2 corresponds structurally essentially to the battery system 100a according to FIG. 1, for which reason in particular the distinguishing features of the two battery systems will be subsequently described in order to avoid unnecessary repetition.

Figure 2:
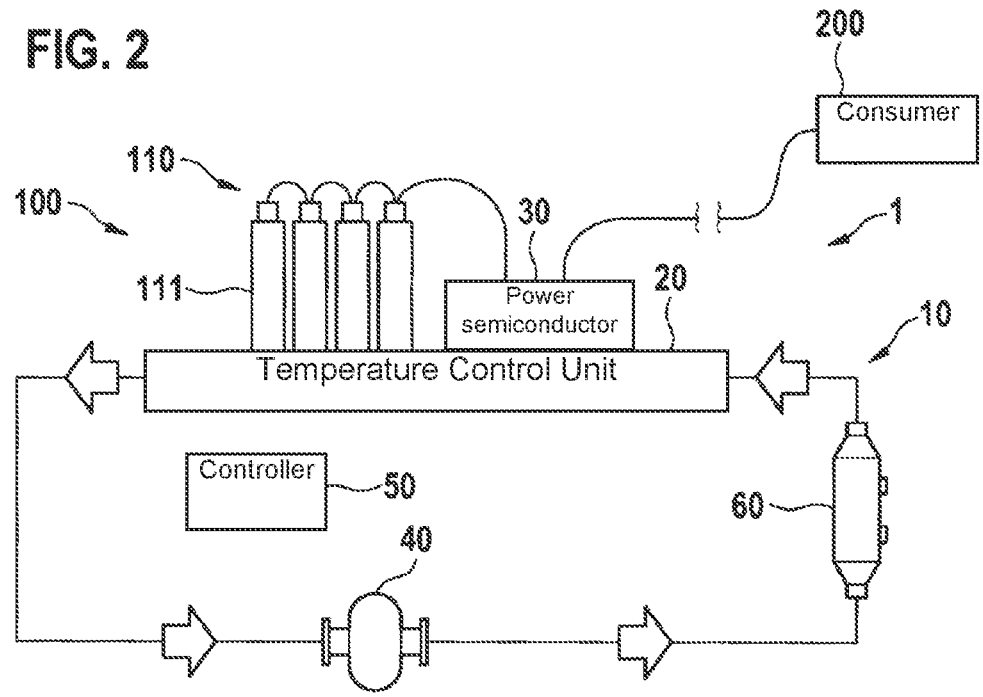

The battery system 100 which is illustrated in FIG. 2 differs, in particular, from the battery system 100a illustrated in FIG. 1 in that the temperature control device 1 does not have a separate temperature control element 70. In the illustrated temperature control device 1, the power semiconductor 30 is assigned to the temperature control unit 20, or positioned thereon, in such a way that the temperature control unit 20 can be heated by waste heat of the power semiconductor 30, which waste heat is produced during a disconnection and/or establishment of a flow of electrical current between the consumer 200 and the battery 110. For this purpose, the temperature control medium in the circulation system 10 can be heated by the waste heat of the power semiconductor, and the feed unit 40 is configured in such a way that the heated temperature control medium can be fed directly to the battery 110 or into the direct vicinity of the battery 110 in the direction thereof through the circulation system 10 and as a result the at least one battery 110 can be heated. The direction of flow of the temperature control medium can be reversed here by means of the feed unit 40, i.e. the feed unit 40 is configured correspondingly. The power semiconductor 30 is embodied as an IGBT according to the embodiment illustrated in FIG. 2.

A method according to the invention for heating the battery 110 of the battery system 100 with the temperature control device 1 will subsequently be described with respect to FIG. 2. In a first step, the requirement to heat the battery 110, for example in the case of a cold start of a motor vehicle is detected here. In a subsequent step the temperature control medium in the circulation system 10 is then heated by the waste heat of the power semiconductor 30. In this context, the power semiconductor 30 is operated at a frequency of approximately 20 kHz with a low efficiency level at which a heat loss of approximately 600 W occurs at the power semiconductor 30. In a subsequent step, the temperature control medium which is heated as a result is then fed directly, or on the shortest possible path, in the direction of the battery 110 through the circulation system 10 by means of the feed unit 40, as a result of which the battery 110 is heated.

In order to carry out the method described above, according to FIG. 2 a controller 50 is made available and correspondingly configured, which controller 50 is connected to the battery system 100 and/or to the temperature control device 1 by cable and/or in a wireless fashion.

What is claimed is:

1. A temperature control device (1) for a battery system (100) having a circulation system (10) including a feed unit (40) for feeding a temperature control medium through the circulation system in one direction and in a reverse direction, the circulation system also including a temperature control unit (20) for controlling the temperature of at least one battery (110) of the battery system (100), and at least one power semiconductor (30) for disconnecting and establishing a flow of electrical current between the at least one battery (110) and a consumer (200) of the at least one battery (110), characterized in that the at least one power semiconductor (30) is connected to the temperature control unit (20) in such a way that the temperature control unit (20) can be heated by waste heat of the at least one power semiconductor (30), which waste heat is produced during disconnection and/or establishment of the flow of electrical current, and wherein the temperature control device (1) is configured to selectively control the feed unit (40) to transport the waste heat in the one direction directly from the at least one power semiconductor (30) to the at least one battery (110), via the temperature control unit (20), to heat the at least one battery (110).

2. The temperature control device (1) according to claim 1, including a controller (50) configured to selectively control the feed unit (40) for feeding the temperature control medium in the one direction, the controller (50) also configured to selectively control the feed unit (40) for feeding the heated temperature control medium in the reverse direction for cooling the at least one battery (110).

3. The temperature control device (1) according to claim 2, wherein the temperature control device (1) is configured to be used in a motor vehicle, and wherein the controller (50) is configured to selectively control the feed unit (40) to transport the waste heat in the one direction when a cold start of the motor vehicle is detected.

4. The temperature control device (1) according to claim 3, wherein the controller (50) is configured to selectively control the feed unit (40) to transport the waste heat in the reverse direction when the at least one battery is not cold.

5. The temperature control device (1) according to claim 2, wherein the temperature control device (1) is configured to be used in an electric vehicle, and wherein the controller (50) is configured to selectively control the feed unit (40) to transport the waste heat in the one direction when a cold start of the electric vehicle is detected.

6. The temperature control device (1) according to claim 1, characterized in that the at least one power semiconductor (30) is arranged on the temperature control unit (20) and the at least one battery (110) is arranged on the temperature control unit (20) and spaced from the at least one power semiconductor (30).

7. The temperature control device (1) according to claim 1, characterized in that the at least one power semiconductor (30) has a bipolar transistor with an insulated gate electrode (IGBT) and/or a power metal oxide semiconductor field-effect transistor (MOSFET).

8. A battery system (100) having the at least one battery (110) and the temperature control device (1) according to claim 1, wherein the battery system is configured such that the at least one battery (110) can be heated by the temperature control device (1).

9. The temperature control device (1) according to claim 1, characterized in that the at least one power semiconductor (30) is arranged directly on the temperature control unit (20) and spaced from the at least one battery (110) arranged on the temperature control unit.

10. The temperature control device (1) according to claim 1, characterized in that flow of electrical current between the at least one battery (110) and the consumer (200) is disconnected and restored by the at least one power semiconductor (30) with a frequency in a range from 19.5 kHz to 22 kHz.

11. A road vehicle including the temperature control device (1) according to claim 1, wherein the temperature control unit (20), the battery system (100), and the circulation system (10) are provided with the road vehicle.

12. The road vehicle according to claim 11, wherein the consumer (200) is an electric drive.

13. The temperature control device according to claim 1, wherein the temperature control unit (20) is a plate-shaped temperature control unit that the temperature control medium passes through.

14. A motor vehicle including the temperature control device (1) according to claim 1, wherein the temperature control unit (20), the battery system (100), and the circulation system (10) are provided with the motor vehicle, and wherein the consumer (200) is an electric drive.

15. A method for heating at least one battery (110) of a battery system (100) with a temperature control device (1), wherein the temperature control device (1) includes a circulation system (10) with a temperature control unit (20) and at least one power semiconductor (30) for disconnecting and establishing a flow of electrical current between the at least one battery (110) and a consumer (200), the method comprising heating the temperature control unit (20) by waste heat of the at least one power semiconductor (30), which waste heat is generated during the disconnection and/or establishment of the flow of electrical current, and selectively transporting the waste heat to the at least one battery.

16. The method according to claim 15, characterized in that the circulation system (10) has a feed unit (40) for feeding a temperature control medium through the circulation system, wherein the temperature control medium is heated in the circulation system (10) by the waste heat of the power semiconductor at the temperature control unit (20), the heated temperature control medium is fed directly to the at least one battery (110) through the circulation system by the feed unit (40), and as a result the at least one battery (110) is heated.

17. The method according to claim 16, wherein the circulation system (10) includes a heat exchanger (60) for cooling the temperature control medium, and wherein the feed unit (40) selectively reverses a direction of flow of the temperature control medium for selectively cooling the at least one battery.

18. The method according to claim 16, wherein the consumer (200) is an electric drive for driving an electric vehicle.

19. The method according to claim 15, characterized in that the at least one power semiconductor (30) for heating the at least one battery (110) is operated with an efficiency level which is lower than an efficiency level with which the at least one power semiconductor (30) is operated when the at least one battery (110) is not heated by the at least one power semiconductor (30).

20. The method according to claim 15, characterized in that flow of electrical current between the at least one battery (110) and the consumer (200) is disconnected and restored by the at least one power semiconductor (30) with a frequency in a range from 19 kHz to 25 kHz.

* * * * *